(12) United States Patent
Ruemelin et al.

(10) Patent No.: US 10,486,533 B2
(45) Date of Patent: Nov. 26, 2019

(54) DISPLAY AND OPERATING DEVICE FOR A MOTOR VEHICLE, OPERATING ELEMENT, AND MOTOR VEHICLE

(71) Applicant: Bayerische Motoren Werke Aktiengesellschaft, Munich (DE)

(72) Inventors: Sonja Ruemelin, Munich (DE); Christopher Roelle, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 266 days.

(21) Appl. No.: 15/460,960

(22) Filed: Mar. 16, 2017

(65) Prior Publication Data

US 2017/0182890 A1 Jun. 29, 2017

Related U.S. Application Data

(63) Continuation of application No. PCT/EP2015/067831, filed on Aug. 3, 2015.

(30) Foreign Application Priority Data

Sep. 16, 2014 (DE) .................. 10 2014 218 493

(51) Int. Cl.
*B60K 37/06* (2006.01)
*B60K 35/00* (2006.01)
(Continued)

(52) U.S. Cl.
CPC .............. *B60K 37/06* (2013.01); *B60K 35/00* (2013.01); *G06F 3/0202* (2013.01);
(Continued)

(58) Field of Classification Search
CPC .. B60K 37/06; B60K 35/00; B60K 2350/102; B60K 2350/104; B60K 2350/2004;
(Continued)

(56) References Cited

U.S. PATENT DOCUMENTS 5,805,146 A * 9/1998 Jaeger ................. G02F 1/13306
345/172
2009/0306795 A1* 12/2009 Robinson ........... G05B 19/0425
700/83
(Continued)

FOREIGN PATENT DOCUMENTS

DE 20 2005 010 570 U1 9/2005
DE 10 2008 040 755 A1 2/2010
(Continued)

OTHER PUBLICATIONS

International Search Report (PCT/ISA/210) issued in PCT Application No. PCT/EP2015/067831 dated Dec. 22, 2015 with English translation (five pages).
(Continued)

*Primary Examiner* — Tom V Sheng
(74) *Attorney, Agent, or Firm* — Crowell & Moring LLP (57) ABSTRACT

A display and operating device for a motor vehicle includes a display area, and an operating element that is disposed on the display area. The operating element for detecting an operating action is movable on the display area within a region of movement. The operating element is movable in a translatory manner on the display area.

8 Claims, 3 Drawing Sheets

(51) Int. Cl.

| | | |
|---|---|---|
| *G06F 3/02* | (2006.01) | |
| *G06F 3/0487* | (2013.01) | |
| *G06F 3/0362* | (2013.01) | |
| *G06F 3/0484* | (2013.01) | |
| *G06F 3/0354* | (2013.01) | |
| *G06F 3/039* | (2013.01) | |
| *G05G 1/02* | (2006.01) | |
| *G05G 1/08* | (2006.01) | |

(52) U.S. Cl.
CPC .......... *G06F 3/0354* (2013.01); *G06F 3/0362* (2013.01); *G06F 3/0393* (2019.05); *G06F 3/0487* (2013.01); *G06F 3/04847* (2013.01); *B60K 2370/126* (2019.05); *B60K 2370/128* (2019.05); *B60K 2370/145* (2019.05); *B60K 2370/1537* (2019.05); *G05G 1/02* (2013.01); *G05G 1/08* (2013.01)

(58) Field of Classification Search
CPC .... G06F 3/0202; G06F 3/0354; G06F 3/0362; G06F 3/04847; G06F 3/0487; G05G 1/02; G05G 1/08
See application file for complete search history.

(56) References Cited

U.S. PATENT DOCUMENTS

| | | | |
|---|---|---|---|
| 2010/0020042 A1* | 1/2010 | Stelandre | B60K 35/00 345/174 |
| 2010/0073288 A1 | 3/2010 | Kramlich | |
| 2010/0259375 A1* | 10/2010 | Ferren | B60K 35/00 340/462 |
| 2012/0212461 A1* | 8/2012 | Akutsu | G06F 3/041 345/184 |
| 2014/0098998 A1 | 4/2014 | Sharma et al. | |
| 2015/0084886 A1* | 3/2015 | Kamiyama | G06F 3/03548 345/173 |
| 2017/0153718 A1* | 6/2017 | Brown | B60K 37/06 |
| 2018/0032213 A1* | 2/2018 | Touyama | G06F 3/0481 |
| 2018/0074639 A1* | 3/2018 | Powell | G06F 3/044 |

FOREIGN PATENT DOCUMENTS

| | | |
|---|---|---|
| DE | 10 2012 217 786 A1 | 4/2014 |
| DE | 10 2013 205 305 A1 | 10/2014 |
| EP | 2 511 807 A2 | 10/2012 |
| GB | 2482571 A | 2/2012 |
| WO | WO 2008/113542 A1 | 9/2008 |
| WO | WO 2010/112463 A1 | 10/2010 |

OTHER PUBLICATIONS

German-language Written Opinion (PCT/ISA/237) issued in PCT Application No. PCT/EP2015/067831 dated Dec. 22, 2015 (five pages).

German Search Report issued in counterpart German Application No. 10 2014 218 493.2 dated Jun. 24, 2015 with partial English translation (12 pages).

* cited by examiner

DISPLAY AND OPERATING DEVICE FOR A MOTOR VEHICLE, OPERATING ELEMENT, AND MOTOR VEHICLE

CROSS REFERENCE TO RELATED APPLICATIONS

This application is a continuation of PCT International Application No. PCT/EP2015/067831, filed Aug. 3, 2015, which claims priority under 35 U.S.C. § 119 from German Patent Application No. 10 2014 218 493.2, filed Sep. 16, 2014, the entire disclosures of which are herein expressly incorporated by reference.

BACKGROUND AND SUMMARY OF THE INVENTION

The embodiments of the present invention relate to a display and operating device, particularly for a motor vehicle, having a display area and an operating element that is disposed on the display area, wherein the operating element for detecting an operating action is movable on the display area within a region of movement. Also provided is an operating element for a display and operating device, and a motor vehicle having a display and operating device.

During a long period of time of technical development, display devices for representing items of information, and operating elements for influencing the items of information represented on the display areas of the display devices, were spatially separated. A consolidation of display areas and operating elements has been experienced by way of the development of so-called touch screens, such as contact-sensitive display screens. Touch screens are of great importance in numerous technical fields. In particular, touch screens are also increasingly often offered in motor vehicles. By means of such a touch screen, the driver can be offered numerous operating possibilities, wherein the selection and the representation of the operating possibilities may be modified depending on the situation. Nowadays, touch screens with liquid crystal displays are predominantly employed. Contact measurement can be carried out by means of resistive, capacitive, and/or inductive methods.

US 2014/0098998 A1 discloses a display device for a motor vehicle, in which the display is generated by means of a rear-projection device. Herein, a projection device generates an image on the rear side of a partially transparent projection area. The front side of the projection area faces a vehicle user, the projected image being visible on said front side. The system disclosed furthermore comprises an infrared camera that is directed onto the rear side of the projection area, and an infrared light-emitting diode for illuminating the projection area. The image that is detected by the infrared camera, by virtue of the semi-transparent projection area, comprises objects which are located on the front side of the projection area. In this way, a hand or another object that identifies a vehicle user may be identified. The system can therefore be used for authenticating a user.

A refinement of the afore-described rear-projection system became known by way of a public presentation by the Texas Instruments company at the 2013 Consumer Electronics Show (CES) in Las Vegas, USA. The refined rear-projection system can identify operating actions that have been performed using one or a plurality of fingers, as they can typically be used in the case of the afore-described conventional touch screens. In particular, the system can represent virtual operating elements such as switch areas, for example, on the display area, and can identify if and when the virtual operating elements are activated by a finger.

It is important in particular in motor vehicles that the user is able to perform operating actions rapidly and in a simple manner, without the attention of said user being diverted from the traffic on the road for too long. Therefore, despite the use of touch screens, it is typical for physical operating elements to be provided for the most important operating actions. One example of such an operating element is a rotary selector for regulating a volume of an audio system of the motor vehicle. The operation of a touch screen is often predefined by hierarchically structured menus. Another example of an often provided physical operating element is a push button, in the case of the activation of which the user, while bypassing the sub-menus of the menu hierarchy, can return to a main menu from any state.

It is disadvantageous in physical operating elements that are attached outside the display area that the user must perform operating actions outside of the combined display and operating area that said driver has become accustomed to by using touch screens. For alleviating this disadvantage, the already mentioned system that was presented at the 2013 CES comprises a rotary button that is attached to the display area. This consists of an annular rotatable operating element attached fixedly to the display area. Markings that are capable of optical detection are attached to the rear side of the rotary button. A rotation of the operating element is identified in that the rotation of the markings is detected by a camera. An internal area of the annular operating element remains free. Therefore, the display area can be seen on the internal area. Thus, variable representations can be projected in the afore-described manner onto the internal face. Furthermore, operating actions that are performed on the internal area can be detected. The operating element may thus be used as a rotary/push actuator, since said operating element permits both pushing operations (on the internal area) as well as rotating operations.

One of the objects of the inventive display and operating device is based on providing a display and operating device which permits a comparatively large number of operating actions. This object is furthermore based on providing an operating element for a display and operating device, and a motor vehicle, each permitting a comparatively large number of operating actions.

These objects are achieved by a display and operating device that is movable in a translatory manner on the display area. In other words, the operating element can be displaced on the display area. In that the operating element is movable in a translatory manner, the former can be used for detecting a multiplicity of operating actions. The operating element herein can be used for detecting a plurality of mutually dissimilar operating actions. That operating action for the detection of which the operating element is adapted in a specific state or at a specific point in time, respectively, may be displayed to the user by means of the display device, for example. The operating element can be used for setting a specific value in that a scale of values is displayed on the display area, the user being able to move the operating element along said scale of values. The same operating element can be used in another mode for setting another value in that the scale is modified. For example, a scale may represent an interior temperature of a motor vehicle that is to be set by the user, and another scale (represented in another mode or at another point in time, respectively) can represent a brightness of an interior lighting that is to be set by the user.

The operating element is attached to the display area of the display and operating device. The maximum region in which the operating element is movable is thus limited to the display area. A translatory movement on the display area can be possible in every direction such that the operating element can be movable from every arbitrary point of the display area to every other arbitrary point of the display area on every arbitrary path between the two points. An exemplary application for an operating element that is designed in such a manner is a temperature controller for a motor vehicle. A representation of a plan view of an interior of the motor vehicle can be displayed on the display area. In order for the temperature in a specific region of the motor vehicle to be modified, the operating element can be moved to that location on the display area that corresponds to the specific region. The nominal temperature that is envisaged for the specific region can subsequently be set. Setting can likewise be performed by way of the operating element, to which end said operating element can be designed so as to be rotatable, for example.

The operating element is particularly suitable for a display device that is configured as a rear-projection device, wherein the display area is a projection area of the rear-projection device. A particularly versatile use of the inventive operating element is made possible by the afore-described projection device and by an identification unit that is configured as a camera system, for example.

The operating element on that side thereof that faces the display area may have at least one marking, in which an identification unit of the display and operating device is adapted for identifying a position of the at least one marking on the display area. The design of the marking may be made dependent on the choice of the display and operating device. If the display and operating device is a rear-projection device, the marking may comprise a colored marking of a specific shape. The color and the shape of the marking herein are advantageously to be chosen such that the marking can be identified as reliably as possible by the identification unit. The term color herein is to be understood as all properties which influence the reflection, absorption, and refraction of electromagnetic waves. The color may be chosen such that as high a proportion as possible of the light output that is emitted by the rear-projection device is reflected. The color may also be chosen such that light of a specific wavelength is reflected. The shape may be chosen such that any confusion with other patterns that are detected by the identification unit is minimized. For example, a fingertip that is placed onto the display area is detected by the camera system of the rear-projection device as an approximately circular pattern. In order for the marking to be made distinguishable therefrom as positively as possible, the shape of said marking may be rectangular. The shape may also be more complex. For example, an interrupted shape, such as is formed by a plurality of non-contiguous polygons, for example, is conceivable.

The marking can also have electric, in particular resistive, inductive, and/or capacitive properties. Such a design is advantageous in particular when the display and operating device comprises a touch screen which is operable by means of resistive, inductive, and/or capacitive effects.

Instead of, or in addition to, markings, a movement of the operating element can also be identified in other ways. An operating element can have velocity sensors, for example, which are able to identify a translatory and/or a rotary movement (that is to say a displacement and/or a rotation). The information pertaining to the movement identified can be transmitted to downstream processing devices, wherein the information can preferably be electrically transmitted. The information can be wirelessly transmitted. The information can also be transmitted by means of electrical conductor paths that are integrated in the display area.

The operating element can be fastened to the display area in various manners. For example, the operating element can have magnetic properties such that the latter is held on the display area by virtue of magnetism. The magnetic counterforce can be generated by a countermagnet that is disposed on the rear side of the display area. Alternatively or additionally, the display area per se can also be magnetic. The operating element can also be removable. In other words, it may be possible for a user to take off and remove the operating element from the display area. However, in particular when employed in motor vehicles, the force by way of which the operating element adheres to the display area (that is to say the magnetic force of attraction, for example) is to be chosen at least so great that the operating element cannot be displaced on its own, that is to say without a contributory action by the user, or slip off or fall from the display area. Moreover, the force by way of which the operating element adheres to the display area is to be chosen at most so great that the operating element can be moved by the user with an appropriate effort.

The operating element on that side thereof that faces the display area has at least one guide pin, wherein the display area and/or the operating element have/has at least one bore that is adapted for receiving the at least one guide pin, wherein the region of movement of the translatory movement of the operating element is predefined by the shape of the at least one bore. The advantage of this design lies in that the potential translatory movements of the operating element can be restricted, on the one hand. In other words, the translatory movements of the operating element can be predefined and restricted by the choice of the bores in the display area and/or in the operating element. For example, if a bore has the shape of a horizontal line, the operating element can only be moved along this line on the display area. More complex shapes of the bores are also possible. However, the bore has to be chosen so as to be continuous such that the operating element can be moved along the bore. For example, the bore can have the shape of the capital letter "H", that is to say be composed of two parallel vertical bores and of one horizontal bore that is centrically disposed. It is advantageous for the minimum extent of the bore to be chosen only slightly larger than the diameter of the guide pin. On account thereof, stable guiding of the guide pin along the bore is achieved in the case of the guide pin being moved. For example, if the bore has the shape of a horizontal line, the minimum extent is the vertical dimension of the bore.

In that the operating element has a guide pin, fastening of the operating element to the display area is moreover enabled. To this end, the guide pin at the ends thereof can advantageously be comparatively thick, wherein the thickness of an end of the guide pin that faces the operating element is to be chosen greater than the minimum extent of a bore in the operating element, and the thickness of an end of the guide pin that faces the display area is to be chosen greater than the minimum extent of a bore in the display area. In that the thick end of the guide pin lies behind the bore, the guide pin cannot be moved out of the bore. It can thus be prevented that the operating element can be removed from the display area. The operating element is thus fixed to the display area in a simple manner, but is nevertheless movable in a translatory manner on the display area along the bore. In the case of an alternative design, the guide pin disposes of a constant thickness. In order for the guide pin to be fastened to the operating element and/or to the display area, a counter-element which fulfills the same purpose as the ends of the guide pin that are enlarged in terms of thickness of the previously mentioned embodiment is releasably or non-releasably connected in the operating element or on the rear side of the display area, respectively, to the respective end of the guide pin.

In order for a translatory movement of the operating element to be enabled it is necessary only for either the operating element or the display area to have a bore along which the guide pin is movable in a translatory manner. If and when the display area has the bore, that end of the guide pin that faces the operating element can advantageously be fixedly connected to the operating element. In the case of a translatory movement of the operating element the guide pin is then moved too. If and when the operating element has the bore, that end of the guide pin that faces the display area can advantageously be fixedly connected to the display area. In the case of a translatory movement of the operating element the guide pin is then not moved.

If the bore is provided in the operating element, this has the advantage that the bore is not visible in any position of the operating element, since said bore is obscured by the operating element. A further advantage lies in that, in the case of a given shape and dimension of the operating element, a comparatively large freedom of movement in which the bore is at all times covered by the operating element and is thus invisible is enabled. In order for this to be elucidated, an exemplary circular operating element having a diameter of two centimeters is to be assumed. The operating element is to receive a rectilinear region of movement. If and when the operating element has a guide pin that is centrically disposed and is movable in a rectilinear bore in the display area, the rectilinear bore can have a length of at most one centimeter in order for the bore to be covered by the operating element in any potential position of the latter. By contrast, if and when one end of a guide pin is securely fixed in the display area, and if and when a rectilinear bore is located in the operating element, the bore can have a length of at most two centimeters. The freedom of movement in this instance is thus of double the size.

In one design, the operating element is movable in a translatory manner substantially along a direction of main extent. In this case, the bore thus has an elongate shape which can extend substantially in a horizontal manner, vertical manner, or at any other angle. The bore may be a straight line but may also be slightly curved, for example if and when this is advantageous for aesthetic reasons. Particularly advantageously, the length of the bore in the display area, that is to say the extent in the direction of main extent, is chosen to be at most so large that the bore in the case of every potential position of the operating element is superimposed by the latter. In that the operating element is movable in a translatory manner substantially along a direction of main extent, a multiplicity of operating possibilities can be enabled for the user, despite the relatively simple embodiment of the invention.

The inventive display and operating device may be configured for detecting a further operating action being movable in a rotary manner on the display area. In other words, the operating element is thus movable not only in a translatory manner but additionally also in a rotary manner. A multiplicity of additional operating possibilities can be offered to the user in this manner. Uni-dimensional variables such as a temperature, for example, are typically set using rotary selectors. The operating element that is refined in such a manner in an exemplary use in a motor vehicle thus permits that region of which the temperature is to be modified to be initially set by means of a translatory movement, and subsequently the desired temperature to be set by means of a rotary movement. The rotary operating possibility, in addition to the translatory operating possibility, can be implemented in a particularly simple manner if and when the operating element on that side thereof that faces the display area has at least one marking, wherein an identification unit of the display and operating device is adapted for identifying a position of the at least one marking on the display area. The marking in this instance can be utilized both for identifying a translatory as well as a rotary movement.

The operating element may dispose of latching positions that are distributed across the region of movement. A latching position is characterized in that the force which has to be expended for moving the operating element out of the latching position is slightly higher than the force which is otherwise required for moving the operating element. Additionally, a latching position can be identifiable by way of an acoustic signal such as a muted click, for example, which sounds when the latching position is reached. In many design embodiments such an acoustic signal does not have to be generated separately but is created anyway when each latching position is reached. The latching positions can identify positions which the user of the operating element would preferably like to set in the course of the movement. However, the latching positions can also serve the purpose of imparting a haptic sensation to the user when moving the operating element. This is particularly advantageous when the user, when moving the operating element, cannot permanently direct his/her vision toward the operating element, such as can be the case in a motor vehicle in motion, for example. The latching positions can be distributed along the entire region of movement or along a part-region of the entire region of movement. The latching positions can be located along the translatory region of movement and/or along the rotary region of movement.

In one particularly advantageous embodiment, the latching positions that are distributed along the translatory region of movement in the case of an operating element having guide pins are formed in that elements along which the guide pin moves when the operating element moves are attached to the rear side of the display area. Particularly advantageously, the elements push with a minor force against the guide pin. The elements at the latching positions have notches which are suitable for at least partially receiving the guide pin. The notches are to be shaped such that the guide pin, when the operating element is moved further, can also easily exit the notch again, wherein to this end a force that in comparison with a movement outside the resting positions is slightly increased is to be required. Alternatively, it is also possible for the cross section of the bore that receives the guide pin to be slightly reduced at latching positions. Alternatively, it is also possible for the cross section of the bore that receives the guide pin to be slightly increased at latching positions, such that notches are created in the bore. In order to guarantee that the guide pin makes its way into such a notch at least partially, the guide pin is to be pushed with a minor force against that side of the bore on which the notch is located.

Furthermore, the operating element may be annular. This is particularly advantageous if and when the operating element is also movable in a rotary manner, that is to say is rotatable. A particularly advantageous refinement succeeds in that the operating element comprises at least two mutually contiguous or mutually engaging concentric annular elements. Mutually engaging concentric annular elements herein are to be understood to be in particular such elements in the case of which a first annular element therein receives a second annular element in such a manner that only the first element is visible on that side that faces the user of the operating element, while both elements are visible on that side of the operating element that faces the display area.

By way of these features, the guide pins of the operating element can be attached to the dissimilar annular elements of the operating element. In conjunction with the counter-elements of dissimilar design that are located on the rear side of the display area and are connectable to the guide pins and/or form latching positions through contact with the guide pins, the operating element can be designed in a particularly simple and nevertheless versatile manner.

In particular, the annular elements can be moved in a dissimilar manner when the operating element is moved. The annular elements in the case of a translatory movement can be moved collectively, whereas only one of the annular elements is moved in the case of a rotary movement, while the other of said annular elements is not moved.

The annular elements in their entirety can have a fully filled circular surface. In other words, the operating element can then be described as a geometrical circular cylinder. Alternatively, an internal region of the operating element can also remain free such that the operating element can be described as a geometrical hollow cylinder. This is particularly advantageous because the internal face that remains free can be utilized for displaying items of information.

Other objects, advantages and novel features of the embodiments of the present invention will become apparent from the following detailed description of at least one embodiment when considered in conjunction with the accompanying drawings, in which:

DETAILED DESCRIPTION OF THE DRAWINGS

In the figures, identical reference signs identify identical features of the illustrated embodiments of the invention. It is pointed out that the figures illustrated and the associated description are merely exemplary embodiments of the invention. In particular, illustrations of combinations of features in the figures and/or description of the figures are not to be interpreted in such a manner that the invention mandatorily requires the implementation of all features mentioned. Other embodiments of the invention can have fewer, more, and/or other features. The scope of protection of the invention and the disclosure thereof are derived from the appended patent claims and from the complete description. It is moreover pointed out that the illustrations are in-principle illustrations of embodiments of the invention. The mutual arrangement of the individually illustrated elements is chosen in an entirely exemplary manner and in the case of other embodiments of the invention can be chosen differently. Furthermore, the illustration is not necessarily to scale. For the purpose of improved visualization, individual illustrated features may be illustrated in an enlarged or reduced manner.

Figure 1A:
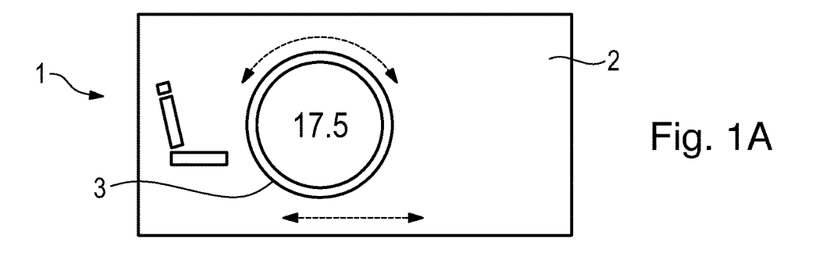
FIGS. 1A and 1B are displays and operating devices in two different states.
Figure 1B:
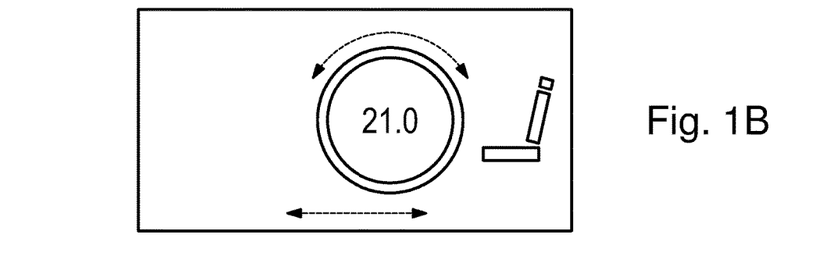

FIG. 1 shows a potential embodiment of a display and operating device 1 according to the invention. It is to be pointed out that a display and operating device 1 according to the invention can have more than those elements that are illustrated in FIG. 1. In particular, a display and operating device 1 which can be a rear-projection device 1, for example, can comprise hardware parts which can be placed behind the display area 2 or at other locations. Such hardware parts are not illustrated in FIG. 1 but may be parts of the illustrated display and operating device. The part illustrations identified by FIG. 1A and FIG. 1B each show one display and operating device 1 having a display area 2 and an operating element 3 that is located thereon. In the example shown, the operating element serves for setting the interior temperature of a motor vehicle, wherein the temperature is separately settable for the interior regions of the driver and of the front passenger. The operating element 3 comprises a rotary ring 3 which is movable in a rotary manner, that is to say is rotatable. Additionally, the rotary ring 3 is movable in a translatory manner, that is to say is displaceable. The possible types of movement of the operating element 3 are identified by dashed arrows in FIG. 1. The translatory movement is possible along a horizontal straight line, wherein a left terminal position of the translatory movement is shown in the upper illustration FIG. 1A, and wherein a right terminal position of the translatory movement is shown in the lower illustration FIG. 1B. The operating element 3 is designed such that it latches into these two illustrated terminal positions. In order for the temperature of the interior region of the driver to be set, the user has to initially move the operating element 3 to the left terminal position, where said operating element 3 latches (illustration FIG. 1A). In this position, the user can set the temperature by way of a rotary movement of the operating element 3, that is to say a rotation. The operating element 3 is designed to be circular, wherein an internal region of the operating element 3 remains free such that the display area 2 which is located below the operating element 3 is visible in this internal region. The set temperature is displayed on the display area 2 in the internal region of the operating element 3. In order for the temperature of the interior region of the front passenger to be set, the user has to initially move the operating element 3 to the right terminal position, where said operating element 3 latches (illustration FIG. 1B). In this position, the user again can set the temperature by way of a rotation of the operating element 3.

Figure 2:
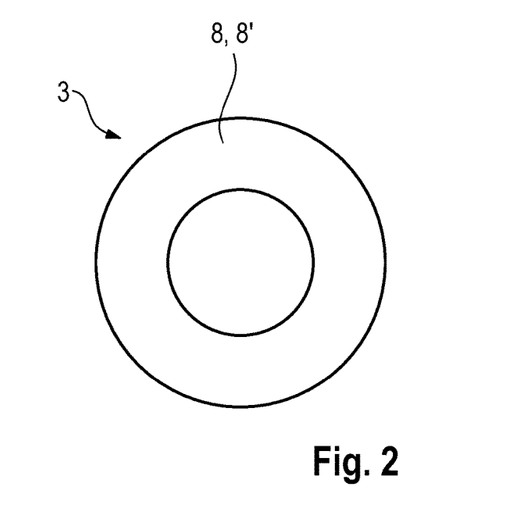
FIG. 2 is an operating element in a head-on frontal view.

FIG. 2 shows an operating element 3 according to the invention in one embodiment in a head-on frontal view. An external annular element 8 of the operating element 3 can be identified in this illustration. This 8 comprises individual elements 8', 8", 8''', this however not being identifiable in the view illustrated in FIG. 2. The individual element 8' faces the observer of the illustrated frontal view. The operating element 3 furthermore comprises an internal annular element 9 which is likewise not identifiable in the view shown in FIG. 2.

Figure 3:
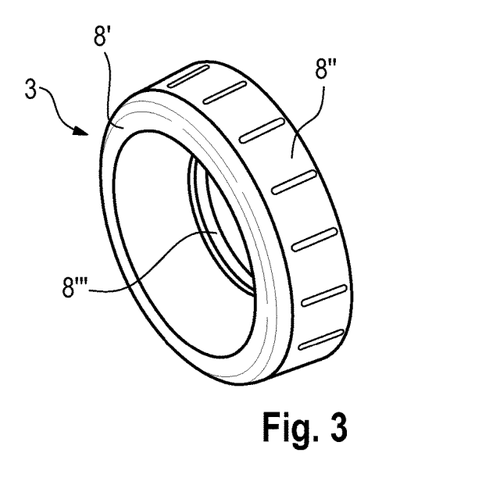
FIG. 3 is an operating element in a perspective frontal view.

FIG. 3 shows an operating element 3 according to the invention in one embodiment in a perspective frontal view. The individual elements 8', 8", 8''' of the external annular element 8 of the operating element 3 can be identified in this illustration. The internal annular element 9 which is likewise a component part of the operating element 3 is again not identifiable. The external annular element 8 in the embodiment shown is composed of a first individual element 8' which is designed as a bezel of the operating element 3 that faces the user. For this reason, this element 8' can be made from a visually appealing material such as chromium, for example. A second individual element 8" forms an external ring of the operating element 3, which in the case of a translatory and/or rotary movement of the operating element 3 represents a main engagement area for the user. For this reason, the individual element 8" can be made from an anti-slip rubber material, for example. The individual element 8" along the circumference thereof can have grooves which are disposed transversely to the circumferential direction and which serve for improved handling. A third individual element 8'" of the external annular element 8 is likewise illustrated. This element individual element 8'", together with the other elements 8', 8" of the external annular element 8 and with the internal annular element 9, serves for the design of the operating element 3 according to the invention and will be explained in yet more detail hereunder.

Figure 4:
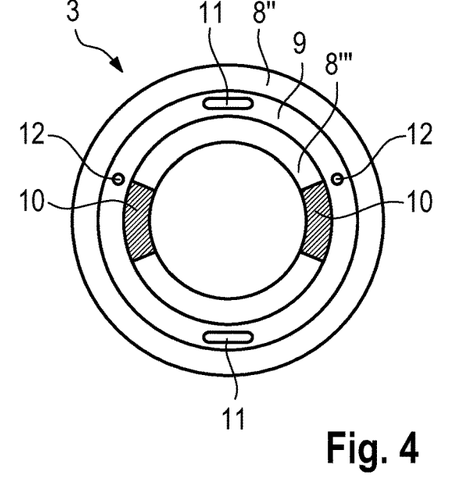
FIG. 4 is an operating element in a head-on rear view.

FIG. 4 shows an operating element according to the invention in one embodiment in a head-on rear view. For improved illustration, the guide pins and counter-elements which can be disposed on the rear side of the operating element 3 are not illustrated. Said guide pins and counter-elements will yet be explained separately hereunder in conjunction with the further figures. The second individual element 8'" of the external annular element 8 in the rear view of FIG. 4 can be identified as an external ring. The third individual element 8" of the external annular element 8 in the rear view of FIG. 4 can be identified as an internal ring. Two markings 10 are attached so as to be mutually opposite on this element 8'". These markings 10 have a particular color. Said markings 10 are therefore identifiable by an identification unit. A display and operating device that is configured as a rear-projection device can comprise a camera system and a light source that emits infrared light, for example. The color of the marking 10 can be chosen such that infrared light is particularly positively reflected. The camera system must be suitable for receiving the reflected infrared light. If the operating element 3 is moved in a translatory and/or rotary manner, the markings 10 likewise move and reflect at every point in time the infrared light that is emitted by the light source. The camera system receives the reflected infrared light. An evaluation unit that is downstream of the camera system can be adapted for evaluating the image of the camera system and for thus detecting the operating action performed, that is to say the movement of the operating element 3. An internal annular element 9 of the operating element 3 can be seen as a ring lying between the elements 8" and 8'". The element 9 has two circular bores 12 which serve for receiving guide pins. The dimension of a bore 12 is to be chosen such that a guide pin that is located therein has no or little lateral play. The dimension of a bore 12 can be chosen to be so small that a guide pin therein is fixed in a stable manner by virtue of the static friction. In this case, fixing of the guide pin in the operating element 3 by means of an enlarged end of the guide pin or by means of a counter-element 5 can be dispensed with. The element 9 furthermore has two elongate bores 11 that likewise serve for receiving guide pins. The length of said elongate bores 11, that is to say the horizontal extent that is illustrated in FIG. 4, can determine the translatory freedom of movement of the operating element 3. However, the freedom of movement can also be smaller than the length of the bore 11. This is the case when the guide pins that engage in the bores 12, in terms of the translatory movement of the former, are restricted by bores in the display area that in terms of lengths thereof are smaller than the length of the bore 11.

The individual elements 8', 8", 8'" of the external annular element 8 of the operating element 3 are interconnected such that all individual elements 8', 8", 8'" of the external annular element 8 move conjointly in the case of a rotary movement of the operating element 3. By contrast, the internal annular element 9 of the operating element 3 is not movable in a rotary manner. Said internal annular element 9 is thus not rotatable and does not move in the case of a rotary movement of the operating element 3. The element 9 is prevented from rotating by the guide pins which connect the internal annular element 9 to the display area 2. The internal annular element 9 is connected to the individual elements 8', 8", 8'" of the external annular element 8 in such a manner that the annular elements 8, 9 are movable in relation to one another in a rotary manner. By contrast, the annular elements 8, 9 are collectively moved in the case of a translatory movement of the operating element 3.

Figure 5:
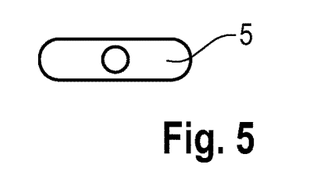
FIG. 5 is a counter-element.

FIG. 5 shows a counter-element 5 in an exemplary design. The counter-element 5 illustrated can be used for fixing the ends of guide pins. To this end, one end of a guide pin is connected to the centric bore, illustrated in FIG. 5, of the counter-element 5. The connection is to be constructed in such a manner that the guide pin cannot be separated again from the counter-element 5 inadvertently or without a comparatively high effort in terms of force. The counter-element 5 can be disposed on the rear side of a display area and there be connected to one end of a guide pin, the other end of the latter being connected to an operating element 3. The other end of the guide pin can be plug-fitted into the bore 12 that is illustrated in FIG. 4, for example. Moreover, one counter-element 5 can be disposed in the operating element 3, so as to fix an end of a guide pin that faces the operating element 3. To this end, a cavity of adequate size has to be provided in the operating element 3. If and when a counter-element 5 is used in order to fix a guide rod in the operating element 3, said guide rod being guided out of the operating element through an elongate bore 11 and being movable in a translatory manner along the length of the elongate bore 11, the cavity in the operating element 3 in which the counter-element 5 is disposed has to be of adequate size in order for the counter-element 5 to be movable in said cavity in the case of a translatory movement of the guide rod. To this end, the cavity can likewise have an elongate shape.

Figure 6:
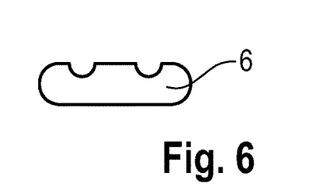
FIG. 6 is an element with latching notches.

FIG. 6 shows an element 6 with latching notches. The latching notches form latching positions that are distributed across the translatory region of movement of the operating element 3. The element 6 can be disposed such that the former by way of that side that is provided with the latching notches is pushed with a minor force against a guide rod of an operating element 3. If and when the guide rod in the case of a translatory movement of the operating element 3 is moved to a position of a latching notch, the guide rod makes its way into the latching notch. In order for the operating element 3 to be moved out of this position in a translatory manner, a slightly increased effort in terms of force is required to move the guide rod out of the latching notch again. The user of the operating element 3 can therefore haptically perceive a latching of the operating element 3. The element 6 is suitable for disposal on a rear side of the display area 2 below and/or above a bore that receives a guide pin of the operating element 3. The element 6 there can be disposed such, for example, that said element 6 slightly protrudes into the opening of the bore and thus slightly constricts the opening of the bore. On account thereof, it is guaranteed that the element 6 pushes with a minor force against a guide pin. However, the element 6 can also be disposed in another manner and in particular push against a guide rod by means of a compression spring.

Figure 7:
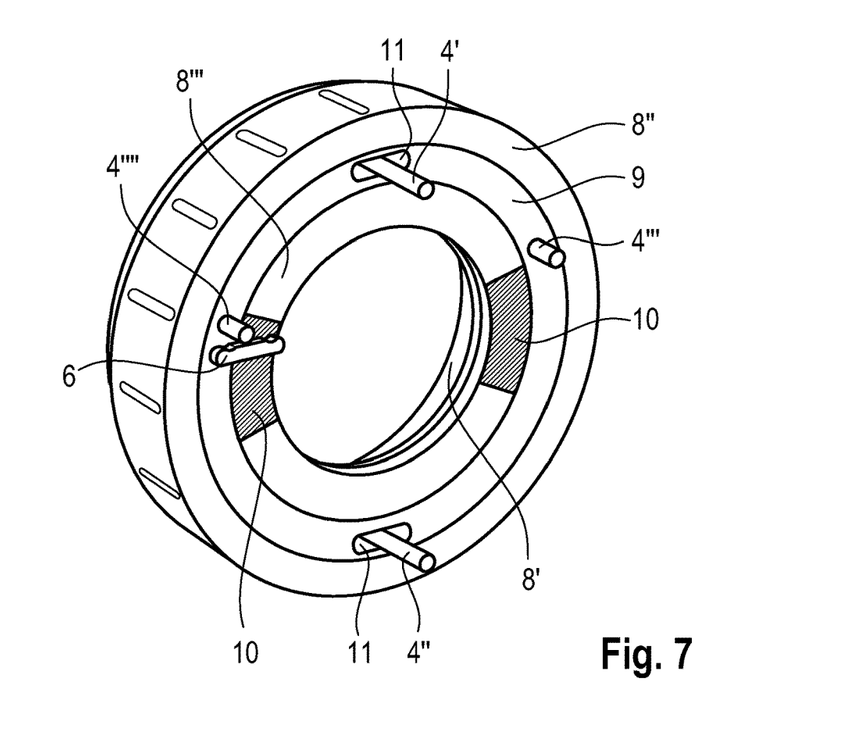
FIG. 7 is an operating element having guide pins and an element with latching notches, in a perspective rear view.

FIG. 7 shows an operating element 3 according to the invention in an embodiment having guide pins 4', 4", 4''', 4'''' and an element 6 having latching notches, in a perspective rear view. The individual elements 8', 8", 8''' of the external annular element 8 and the internal annular element 9 of the operating element 3 are illustrated. Furthermore illustrated are the markings 10 of the third individual element 8''', already explained in the context of FIG. 4, and the bores 10, 11 of the internal annular element 9. The guide pins 4', 4" that are placed in the elongate bores 11, at the end of the former that faces the operating element 3, are each provided with one counter-element 5 such that said guide pins 4', 4" cannot be moved out of the rear side of the operating element 3. The counter-elements 5 of the guide pins 4', 4" are disposed in a cavity that is located in the interior of the operating element 3, and therefore cannot be identified in FIG. 7. Those ends of the guide pins 4', 4" that face away from the operating element 3 are guided through a circular bore in the display area 2 (not illustrated in FIG. 7). These ends of the guide pins 4', 4" can either be fastened to the display area 2 in that the bores in the display area are chosen to be so small that the guide pins 4', 4" are fixed by virtue of the static friction. Alternatively, counter-elements 5 for fixing the guide pins 4', 4" can be disposed on the rear side of the display area 2. Alternatively, the ends of the guide pins 4', 4" on the rear side of the display area 2 can be enlarged such that the ends of the guide pins 4', 4" cannot make their way through the bores of the display area 2. Further guide pins 4''', 4'''' are disposed in the circular bores 12 of the operating element 3. These guide pins 4''', 4'''' by way of the ends thereof that face away from the operating element 3 engage in elongate bores (not illustrated) in the display area 2. The guide pins 4''', 4'''' can be fixed by way of counter-elements 5 on the rear side of the display area 2. However, this is not mandatory, since the operating element 3 is fixed to the display area by means of the guide pins 4', 4". The bores in which the guide pins 4''', 4'''' engage in the display area 2, in terms of length and alignment, should be congruent with the bores 11 of the internal annular element 9 of the operating element 3 such that these bores collectively determine the translatory region of movement of the operating element 3. An element 6 with latching notches that is disposed on the rear side of the display area 2 (not illustrated) pushes from below against the end of the guide pin 4''''. No equivalent element 6 is provided for the guide pin 4''' in the embodiment illustrated in FIG. 7. However, according to a somewhat more complex design, this 6 could be provided in order for the latching effect of the operating element 3 that is perceptible to the user to still be amplified.

Figure 8:
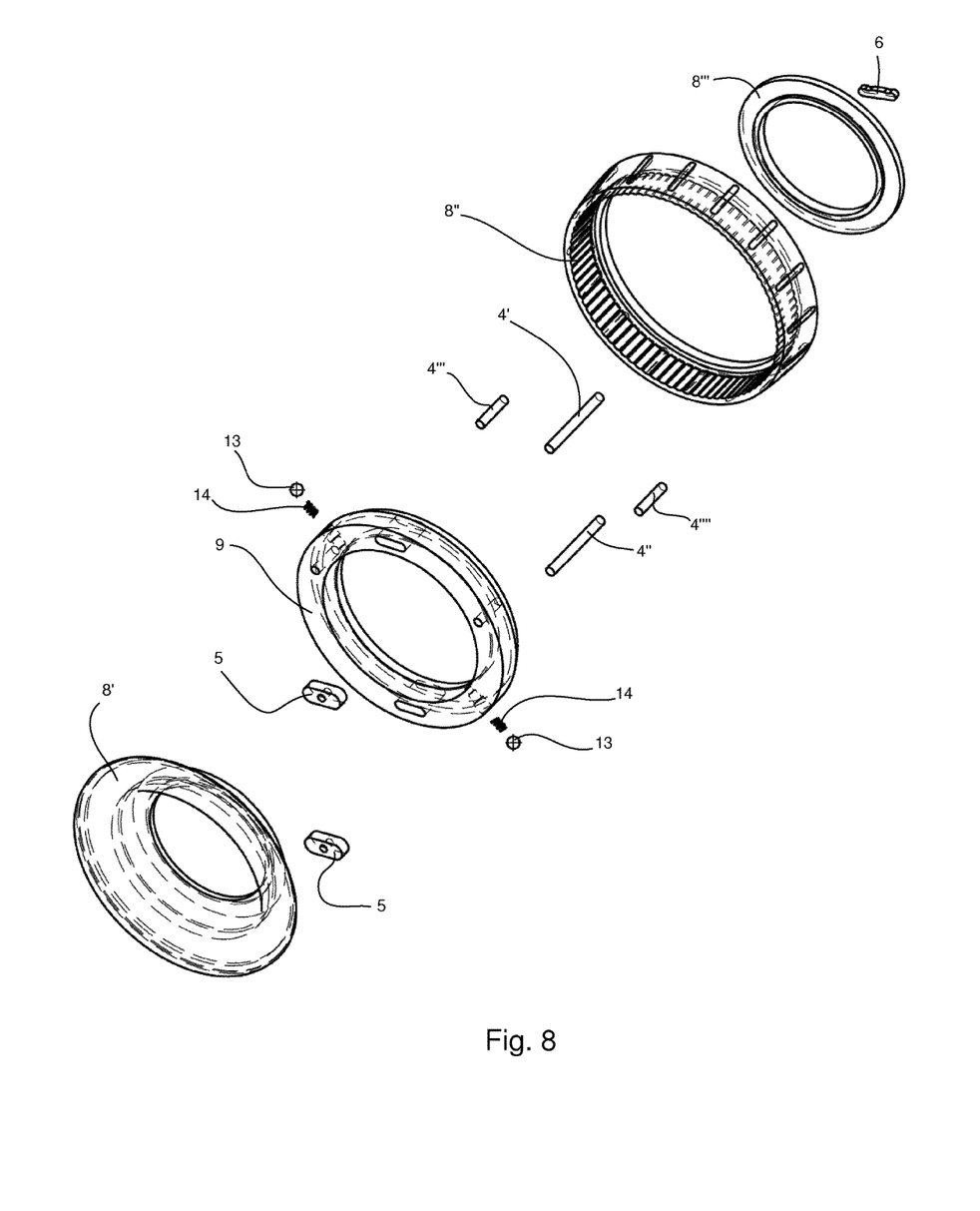
FIG. 8 is a perspective exploded illustration of an operating element.

FIG. 8 shows a perspective exploded illustration of an operating element 3 according to the invention in one embodiment. It is pointed out that the construction illustrated is to be understood as being only exemplary. An operating element in the context of the present disclosure and of the present scope of protection can be designed in many different ways. Therefore, the embodiments shown in the figures must not be understood to be limiting. In order to avoid repetitions, a new explanation of the elements that have already been described above is to be dispensed with. It can be identified in FIG. 8 that counter-elements 5 assigned to the guide pins 4', 4". In the assembled state of the operating element 3 illustrated, these 5 bear on that side of the internal annular element 9 that faces the observer. The cavity in which the elements 5 move in the case of a translatory movement of the operating element 3 is formed by the element 9, on the one hand, and the first individual element 8' of the external annular element 8 of the operating element 3, on the other hand, said first individual element 8' to this end having an adequate depth. The annular element 9 furthermore has cylindrical cavities which are adapted in order to receive springs 14. Spheres 13 are disposed at the ends of the springs 14. The individual element 8", on the internal side thereof, has grooves along its circumference. In the assembled state of the operating element 3 the springs 14 push the spheres 13 against the internal side of the individual element 8" that surrounds the element 9. The spheres 13 in the case of a rotary movement herein are guided over the grooves and into the grooves, the latter thus forming latching positions for the spheres 13. On account thereof, a haptic effect that is perceptible to the user is also achieved in the case of a rotary movement.

LIST OF REFERENCE SIGNS

1 Display and operating device
2 Display area
3 Operating element
4', 4", 4''', 4'''' Guide pins
5 Counter-element
6 Element with latching notches
7 Latching notch
8 External annular element of the operating element
8', 8", 8''' Individual elements of the external annular element of the operating element
9 Internal annular element of the operating element
10 Marking
11 Bore
12 Bore
13 Spherical element
14 Spring The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display and operating device for a motor vehicle, comprising:
 a display area; and
 an operating element that is disposed on the display area, wherein
  the operating element configured to detect an operating action is movable on the display area within a region of movement,
  the operating element is movable in a translatory manner on the display area,
  the operating element on that side thereof that faces the display area has at least one marking,
  an identification unit of the display and operating device is adapted for identifying a position of the at least one marking on the display area,
  the operating element on that side thereof that faces the display area has at least one guide pin, wherein the display area and/or the operating element have/has at least one bore that is adapted to receive the at least one guide pin, and the region of movement of the translatory movement of the operating element is predefined by the shape of the at least one bore.

2. The display and operating device as claimed in claim 1, wherein the operating element is movable in a translatory manner substantially along a direction of main extent.

3. The display and operating device as claimed in claim 2, wherein the operating element configured to detect a further operating action is movable in a rotary manner on the display area.

4. The display and operating device as claimed in claim 3, wherein the operating element disposes of latching positions that are distributed across the region of movement.

5. The display and operating device as claimed in claim 4, wherein the operating element is annular.

6. The display and operating device as claimed in claim 5, wherein the operating element comprises at least two mutually contiguous or mutually engaging concentric annular elements.

7. An operating element for a display and operating device as claimed in claim 6.

8. A motor vehicle having a display and operating device as claimed in claim 7.

\* \* \* \* \*